US012443494B2

(12) United States Patent
Knight et al.

(10) Patent No.: US 12,443,494 B2
(45) Date of Patent: Oct. 14, 2025

(54) PREVENTION OF RESIDUAL DATA WRITES AFTER NON-GRACEFUL NODE FAILURE IN A CLUSTER

(71) Applicant: NetApp, Inc., San Jose, CA (US)

(72) Inventors: Clinton Douglas Knight, Apex, NC (US); Joseph Eli Webster, Wichita, KS (US); Christopher Michael Reeder, Everett, WA (US)

(73) Assignee: NetApp, Inc., San Jose, CA (US)

( * ) Notice: Subject to any disclaimer, the term of this patent is extended or adjusted under 35 U.S.C. 154(b) by 36 days.

(21) Appl. No.: 18/602,963

(22) Filed: Mar. 12, 2024

(65) Prior Publication Data

US 2025/0291685 A1   Sep. 18, 2025

(51) Int. Cl.
| | |
|---|---|
| *G06F 11/00* | (2006.01) |
| *G06F 11/16* | (2006.01) |
| *G06F 11/18* | (2006.01) |
| *G06F 11/20* | (2006.01) |
| *H04L 65/00* | (2022.01) |
| *H04L 67/00* | (2022.01) |

(52) U.S. Cl.
CPC ........... *G06F 11/181* (2013.01); *G06F 11/16* (2013.01); *G06F 11/1666* (2013.01); *G06F 11/20* (2013.01); *G06F 11/2017* (2013.01); *H04L 65/00* (2013.01); *H04L 67/00* (2013.01)

(58) Field of Classification Search
CPC ............. G06F 11/16; G06F 11/20; G06F 3/06
See application file for complete search history.

(56) References Cited

U.S. PATENT DOCUMENTS

| | | | |
|---|---|---|---|
| 9,021,296 B1* | 4/2015 | Kiselev ................ | G06F 3/0647 714/6.23 |
| 12,111,736 B1* | 10/2024 | Agasar ................ | G06F 16/1827 |
| 2016/0371145 A1* | 12/2016 | Akutsu ................ | G06F 3/0619 |
| 2019/0163405 A1* | 5/2019 | Israni .................... | G06F 3/0659 |
| 2020/0034240 A1* | 1/2020 | Natanzon ............ | G06F 11/1448 |
| 2021/0194860 A1* | 6/2021 | Lee ........................ | H04L 9/3242 |

OTHER PUBLICATIONS

Perry, "Kubernetes Storage: An In-Depth Look," Oct. 20, 2020 (Year: 2020).*
Ewegbemi, "Keeping the State of Apps 1: Introduction to Volume and volumeMounts," Feb. 18, 2021 (Year: 2021).*

(Continued)

*Primary Examiner* — Bryce P Bonzo
*Assistant Examiner* — Gabriella Kanani Shelton

(57) ABSTRACT

The technology disclosed herein enables a storage orchestrator controller to prevent residual data from being written to a storage volume when a node fails non-gracefully. In a particular example, a method includes determining a health status of nodes in the cluster and, in response to determining a node in the cluster failed, marking the node as dirty. After marking the node as dirty and in response to determining the node is ready, the method includes directing the node to erase data in one or more write buffers at the node. The one of more write buffers buffer data for writing to one or more storage volumes when the one or more storage volumes are mounted by the node. After the one or more write buffers are erased, the method includes marking the node as clean.

20 Claims, 12 Drawing Sheets

(56) References Cited

OTHER PUBLICATIONS

Y. Matsuo and D. Ikegami, "Performance Analysis of Anomaly Detection Methods for Application System on Kubernetes with Auto-scaling and Self-healing," 2021 17th International Conference on Network and Service Management (CNSM), Izmir, Turkey, 2021, pp. 464-472 (Year: 2021).*
"Volume Health Monitoring," Jun. 1, 2023 (Year: 2023).*
"Pod Lifecycle," May 5, 2025 (Year: 2025).*
"Persistent Volumes," Mar. 24, 2025 (Year: 2025).*

* cited by examiner

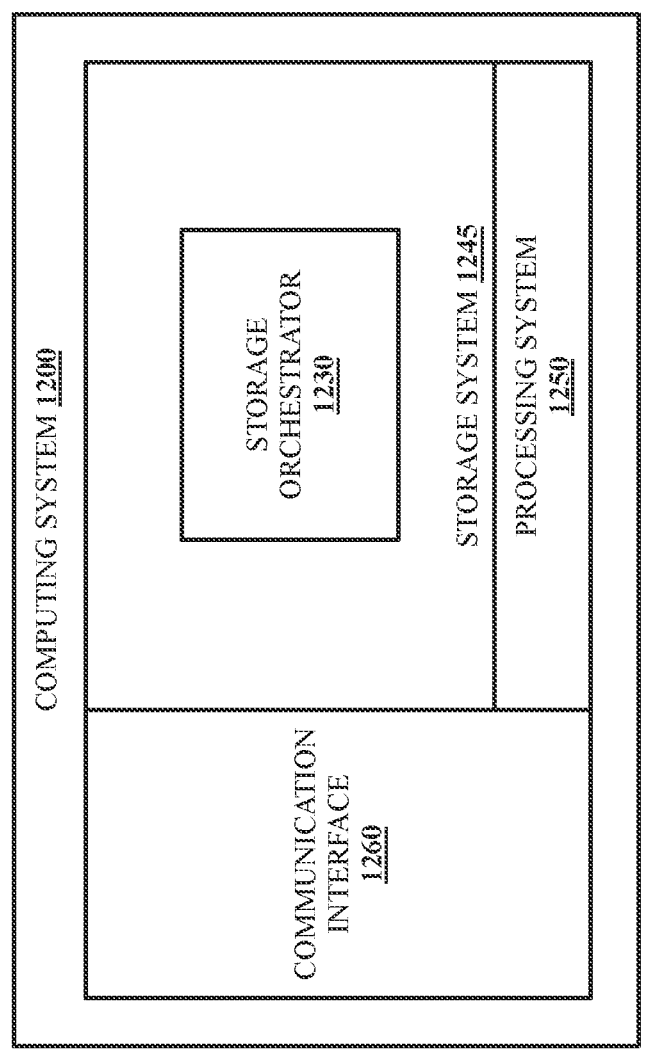

PREVENTION OF RESIDUAL DATA WRITES AFTER NON-GRACEFUL NODE FAILURE IN A CLUSTER

TECHNICAL FIELD

Various embodiments generally relate to failure handling for computing nodes in a cluster configured to write data to shared storage volumes. More specifically, some embodiments relate to prevention of residual data writes after non-graceful node failure in a cluster.

BACKGROUND

Container orchestration platforms, exemplified by Kubernetes, have revolutionized the deployment and management of containerized applications within computing clusters. These platforms offer scalable and efficient solutions for orchestrating containers across a cluster of nodes, simplifying tasks such as deployment, scaling, and load balancing. Kubernetes, as a leading example, employs a master-worker architecture to coordinate containerized workloads for workload management. In Kubernetes, containers are organized into logical units known as pods. A pod represents the smallest deployable unit in the Kubernetes ecosystem and encapsulates one or more containers that share networking and storage resources on a single computing node. This design facilitates the co-location of tightly coupled application components within the same pod, promoting efficient communication and resource sharing.

The master node in a Kubernetes cluster oversees the orchestration of pods, managing their deployment, scaling, and scheduling across the worker nodes. Each pod is assigned a unique IP address and can communicate with other pods within the cluster through a shared network namespace. This enables seamless interaction between application components running in different pods, fostering modularity and scalability in distributed systems.

Persistent storage is a critical requirement for many containerized applications, necessitating the integration of storage solutions into Kubernetes environments. NetApp Trident is an example of a dynamic storage orchestrator and provisioner designed to streamline the management of storage resources within Kubernetes clusters. By automating the provisioning and lifecycle management of storage volumes, Trident enables seamless integration of durable storage solutions into Kubernetes environments.

Trident operates as an external controller within the Kubernetes ecosystem, interacting with the cluster's controller to fulfill storage requests from pods. When a user defines a persistent volume claim (PVC) in their Kubernetes manifest, Trident translates the request into actions on the underlying storage infrastructure, dynamically provisioning storage volumes as needed. The storage backends may include ONTAP, SolidFire, E-Series, etc. for flexibility in complying with the requirements of containerized applications.

SUMMARY

The technology disclosed herein enables a storage orchestrator controller to prevent residual data from being written to a storage volume when a node fails non-gracefully (e.g., loses a network connection, crashed, loses power, or otherwise fails in an unexpected manner). In a particular example, a method includes determining a health status of nodes in the cluster and, in response to determining a node in the cluster failed, marking the node as dirty. After marking the node as dirty and in response to determining the node is ready, the method includes directing the node to erase data in one or more write buffers at the node. The one of more write buffers buffer data for writing to one or more storage volumes when the one or more storage volumes are mounted by the node. After the one or more write buffers are erased, the method includes marking the node as clean.

In another example, a system includes a storage system storing a plurality of storage volumes, a controller for a storage orchestrator executing on a controller node of the computing nodes, and a plurality of servers for the storage orchestrator executing on a plurality of the computing nodes. The plurality of computing nodes is configured to execute one or more pods that access the storage system. The controller is configured to determine a node in the cluster has failed and mark the node as dirty. A server of the plurality of servers executing on the node is configured to send, to the controller, a request for mounting of a storage volume of the plurality of storage volumes while the node is marked as dirty. The controller is also configured to reject the request and direct the server to erase a write buffer on the node. The server is configured to erase the write buffer in response to direction from the controller.

In a further example, a method includes executing a pod on a computing node in the cluster. A container orchestration platform manages pod execution across the cluster. The method further includes receiving an indication that a pod has failed due to the computing node being out of service. After receiving the indication, the method includes reassigning a processing task for the pod to another pod on another computing node in the cluster and rejecting a storage volume mounting request due to the processing task having been reassigned.

BRIEF DESCRIPTION OF THE DRAWINGS

FIG. 12 illustrates a computing system for preventing residual data writes to storage volumes after a non-graceful node failure.

DETAILED DESCRIPTION

Figure 1:
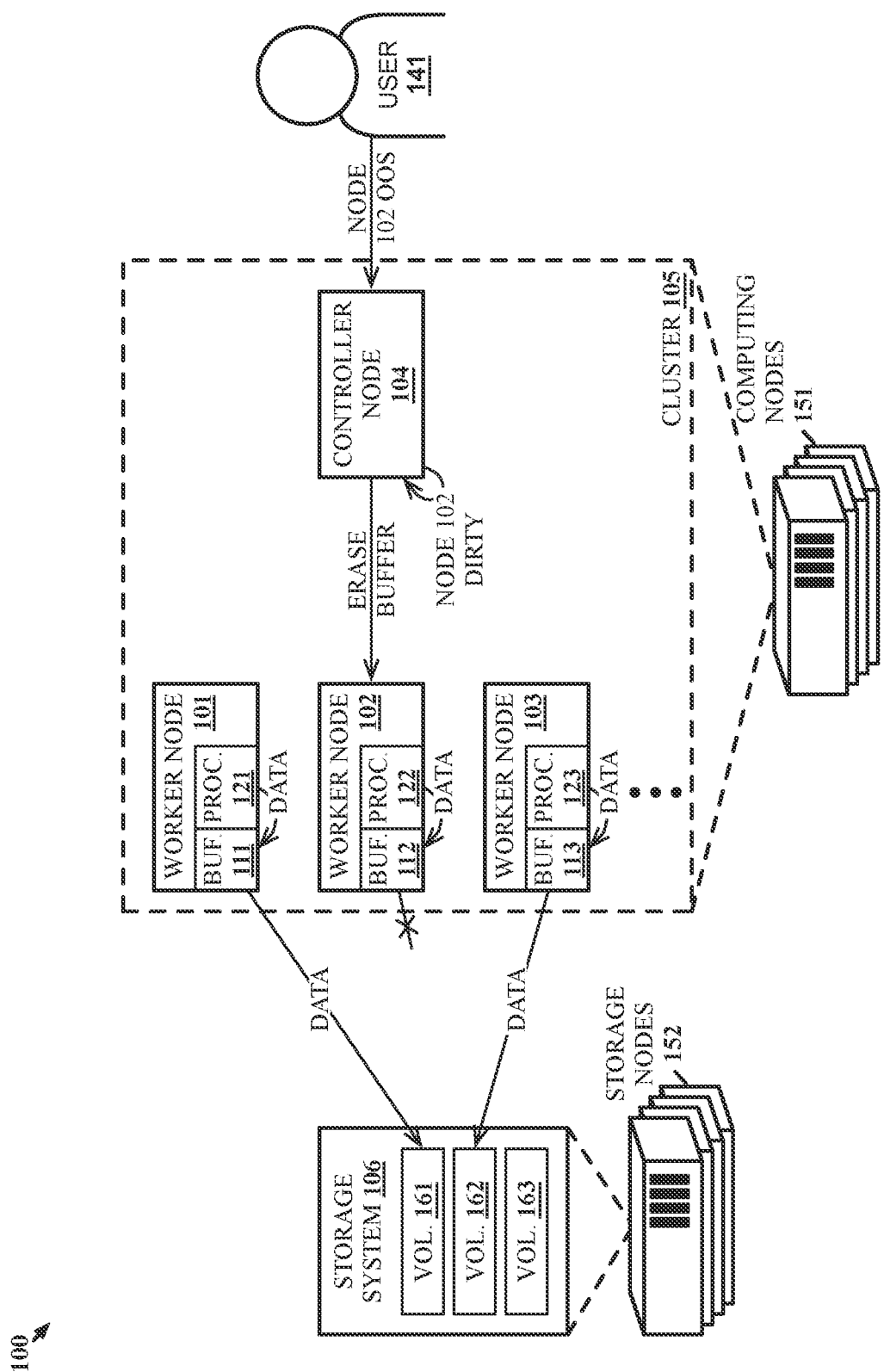
FIG. 1 illustrates an implementation for preventing residual data writes to storage volumes after a non-graceful node failure.

Container orchestration platforms, such as Kubernetes, may employ a sophisticated scheduler that dynamically manages the distribution of workloads across nodes in the cluster. When a node becomes unavailable (due to maintenance, failure, or other reasons), the scheduler detects this change and reassigns the affected tasks to other healthy nodes. This process ensures that the overall system remains operational and resilient. Kubernetes draining mechanism plays a crucial role here as it gracefully moves pods away from the failing node by evicting them and preventing new pods from being scheduled on it. Once the node is back online, Kubernetes reverses the process, allowing the node to accept new pods again. This seamless task reassignment prevents data loss and maintains system stability.

When a node becomes unresponsive, the Kubernetes scheduler cannot perform its intended tasks to gracefully shut down the node (e.g., reassign pods or processing tasks to other nodes prior to shutting down the node or otherwise taking the node out of service) because the scheduled cannot contact the node. The scheduler further cannot determine the status of pods executing thereon. For instance, if the node crashes or loses power, the pod will stop executing in all likelihood. If the node loses its network connection (e.g., the network cable is unplugged from the node), then the pod may still be executing, potentially along with other processes on the node. Since the scheduler cannot determine the cause of the unresponsiveness, the schedule may not reassign workloads of the node until more information can be obtained. Additional information may be received from the node itself once the scheduler can reach the node again or may be received from a user with knowledge of the node. In an example of the latter, the user may be an administrator of the computing systems forming the cluster. The user may manually check on the node (e.g., upon being notified by Kubernetes that the node is unreachable) to determine the node's status. Upon determining that the node is out of service (e.g., due to a network disconnection or other issue that the node cannot recover from without outside intervention), the user may indicate to Kubernetes that the node is out of service and, therefore, should no longer be considered in the cluster. The scheduler can then reassign pods or workloads from the out of service node to other nodes that are still operational in the cluster.

Even if the pods and workloads have been reassigned to other nodes, there may be residual data on the out of service node. For instance, if the node did not fully power down, there may be data waiting to be written to a storage volume. Since the scheduler has enabled workload processing to proceed on other nodes, writing the data when the out of service node is ready again may result in data corruption in the storage volume. The storage system orchestrator described below prevents the node from writing any residual data remaining on the node when the node becomes ready after being out of service. Since the storage system orchestrator regulates access to the storage volumes, the storage system orchestrator is at a position in the volume mounting process to prevent volume access until the node has been cleaned of residual data. Once cleaned, node is allowed to mount storage volumes for access by pods assigned to the node by the scheduler after becoming ready.

Various embodiments of the present technology provide for a wide range of technical effects, advantages, and/or improvements to computing systems and components. For example, various embodiments may include one or more of the following technical effects, advantages, and/or improvements: 1) the storage orchestrator, which controls a node's ability to mount a storage volume, denies mounting requests from nodes that could potentially write residual, unwanted data to the storage volume; 2) the storage orchestrator communicates with a container orchestration platform to determine whether a node is a threat to write residual data (i.e., is dirty); 3) the storage orchestrator controller 340 updates permissions in a storage system storing data volumes to deny a dirty node access to the data volumes; and/or 4) the storage orchestrator erases the residual data from a dirty node to clean the node of the data before mounting storage volumes to the node.

FIG. 1 illustrates implementation 100 for preventing residual data writes to storage volumes after a non-graceful node failure. Implementation 100 includes computing nodes 151, which include cluster 105 of worker nodes 101-103 and controller node 104. Cluster 105 may include any number of nodes, not just four as shown in this example. Implementation 100 also includes storage nodes 152, which host storage system 106. In this example, storage system 106 includes storage volumes 161-163 but may include other storage volumes in other examples. Computing nodes 151 are computing systems, such as servers, that may include one or more processors, storage, network interfaces, or some other type of computing component. Storage nodes 152 may include similar components to computing nodes 151 with likely a greater emphasis on data storage (e.g., each of storage nodes 152 may include or be connected to storage media, such as hard disk drives, solid state drives, magnetic tape drives, or other storage apparatus—including combinations thereof—for storing data in storage volumes 161-163). While not shown, computing nodes 151 and storage nodes 152 may be connected by communication links, which may include direct links or links including intervening systems, networks, and devices.

In implementation 100, controller node 104 is referred to as a controller node because it is tasked with controlling provisioning and access of worker nodes 101-103 to storage volumes 161-163 of storage system 106. Controller node 104 may perform other functions and may itself be a worker node executing one or more processes like worker nodes 101-103 execute processes 121-123. Storage system 106 may be any type of storage system capable of hosting storage volumes 161-163 for access by nodes of cluster 105. Storage system 106 may be a distributed storage system that distributes data across storage nodes 152 for redundancy, access latency, scalability, etc., or storage nodes 152 may store one or more of storage volumes 161-163 at a single node of storage nodes 152.

Worker nodes 101-103 execute processes 121-123 respectively. Processes 121-123 may be applications executing natively on an operating system of worker nodes 101-103, may be processes executing in containers, may be processes executing in a virtual machine, or may be processes executing in some other manner. Processes 121-123 process data, such as data read from one or more of storage volumes 161-163, and write data to one or more of storage volumes 161-163. Worker nodes 101-103 may execute more than one process in other examples. Data being written to storage volumes 161-163 is placed in respective write buffers 111-

113 before being written to storage volumes 161-163. For example, if process 121 intends for data to be written to storage volume 161, process 121 passes the data into write buffer 111. Write buffer 111 stores data in worker node 101 until it is ready for transmission to storage system 106 for writing in storage volume 161. Write buffer 111 may be a first in, first out (FIFO) buffer that sends data to storage system 106 in the order in which the data was received by write buffer 111 or write buffer 111 may use some other logic to determine when data should be transmitted from write buffer 111. Write buffer 112 and write buffer 113 may use similar logic for transmitting data.

Figure 2:
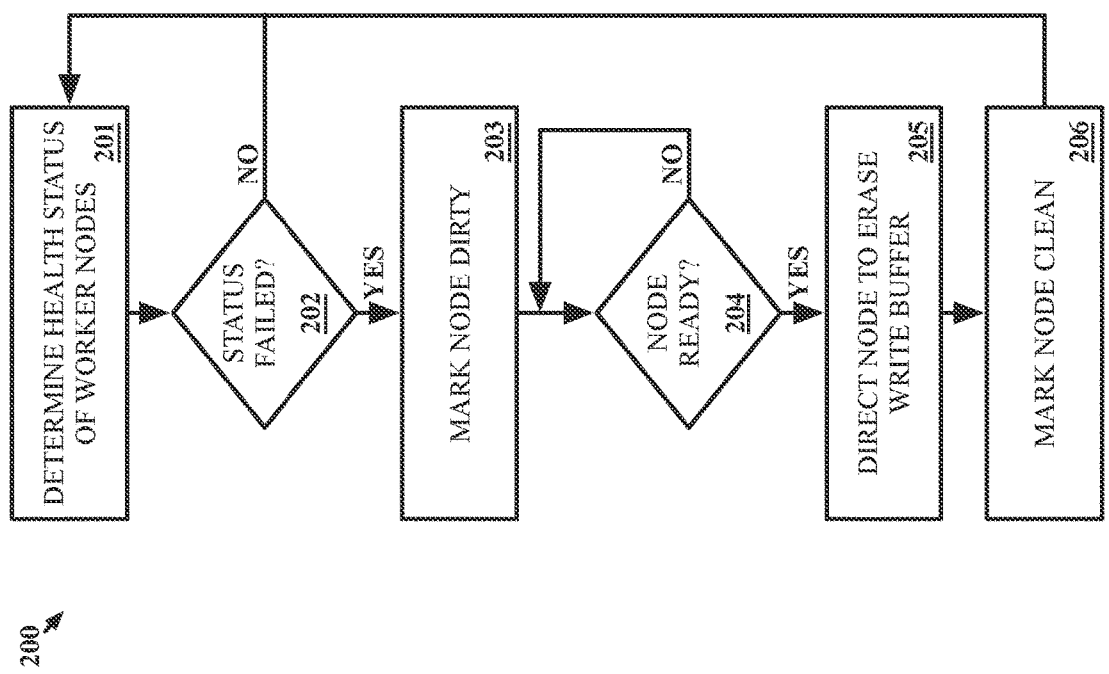
FIG. 2 illustrates an operation to prevent residual data writes to storage volumes after a non-graceful node failure.

FIG. 2 illustrates operation 200 to prevent residual data writes to storage volumes after a non-graceful node failure. In operation 200, controller node 104 determines health status of worker nodes 101-103 (step 201). The health status indicates whether a node is running within cluster 105 or has failed (e.g., is unreachable via a network connection failure to the node, the node crashing, or some other reason the node cannot be reached). The health status may be determined automatically (e.g., by controller node 104 polling worker nodes 101-103 to determine whether they are reachable), an orchestration platform for cluster 105 may inform controller node 104 when a node is unreachable, user 141 may indicate that the node is out of service, or controller node 104 may determine the node has failed in some other manner. When controller node 104 determines a node has failed (step 202), controller node 104 marks the node as dirty (step 203). For example, if user 141 notifies controller node 104 that worker node 102 is out of service, controller node 104 marks worker node 102 as being dirty. Controller node 104 returns to determining health status for other nodes (e.g., worker node 101 and worker node 102) in cluster 105.

Controller node 104 may include a memory register or data structure that stores information about whether a node is dirty. Marking worker node 102 as dirty refers to the possibility that write buffer 112 of worker node 102 still contains data that was not written to one of storage volumes 161-163 prior to worker node 102 becoming unreachable (i.e., failing for the purposes of this example). Terms other than dirty may be used to refer to a similar concept. Should worker node 102 become ready with nothing done to account for the residual data still stored in write buffer 112, the data contained in write buffer 112 may still be written to the storage volume of storage volumes 161-163. Writing that data may "dirty" or corrupt the data being stored in the storage volume. For instance, a processing task being performed by process 122 may have been reassigned to process 123 when worker node 102 became unreachable. If process 123 writes data to storage volumes 161-163 when performing that processing task under the assumption that any data generated by process 122 was lost, then writing the data from write buffer 112 may corrupt the data being stored (e.g., may overwrite data, may cause the stored data to be unintelligible, or may cause at least a portion of the data to be unreadable).

Controller node 104 waits for worker node 102 to become ready again (step 204). Ready refers to the node being in service and able to execute processes again to complete processing tasks on behalf of cluster 105. Similar to when controller node 104 was determining the health status of worker nodes 101-103, controller node 104 may ping worker node 102 and await a response indicating worker node 102 is back in service, an orchestration platform for cluster 105 may inform controller node 104 when worker node 102 is ready, user 141 may indicate that the node is ready, or controller node 104 may determine the node has failed in some other manner. In some examples, worker node 102 may never return to service. In those examples, controller node 104 may leave worker node 102 marked as dirty until controller node 104 is notified to remove the record of worker node 102's status (e.g., a user, or orchestration platform for cluster 105, may indicate worker node 102 is no longer in computing nodes 151 or otherwise does not need a status record). In examples where controller node 104 is actively checking for worker node 102 to be ready (e.g., sending pings), as opposed to simply waiting for a ready indication to be received (e.g., from user 141, an orchestration platform for cluster 105, worker node 102 itself, or elsewhere), controller node 104 may stop actively checking after a predefined period of time so that resources of controller node 104 and the network are not used indefinitely.

Upon determining worker node 102 is ready, controller node 104 directs worker node 102 erase write buffer 112 before any residual data in write buffer 112 can be written to storage volumes 161-163 (step 205). In some examples, controller node 104 may prevent worker node 102 from mounting any of storage volumes 161-163 while worker node 102 is marked dirty. If worker node 102 cannot mount a storage volume, write buffer 112 cannot write data to the storage volume. Permission may be required from controller node 104 before a node can mount a storage volume and controller node 104 may, therefore, not grant worker node 102 permission while marked as dirty. Alternatively, or in addition to permission from controller node 104, controller node 104 may direct storage system 106 not to allow worker node 102 to mount a storage volume. When worker node 102 receives the instruction from worker node 102 to erase write buffer 112, worker node 102 may delete all data in write buffer 112, may delete only data destined for one of storage volumes 161-163, may delete write buffer 112 as a whole (e.g., so a new buffer is created when new data is to be written to one of storage volumes 161-163), or may eliminate the data in some other manner.

After directing worker node 102 to erase write buffer 112, controller node 104 marks worker node 102 as clean (step 206). Marking worker node 102 as clean may include explicitly replacing the dirty indicator stored in association with worker node 102 with a clean indicator or controller node 104 may simply remove the dirty indicator (i.e., worker node 102 is assumed to be clean if no dirty indicator is present). Once worker node 102 is marked clean, worker node 102 can start writing data to storage volumes 161-163. Controller node 104 may grant worker node 102 permission to mount one or more of storage volumes 161-163 and/or may direct storage system 106 to allow worker node 102 to mount storage volumes 161-163. In some examples, controller node 104 may require confirmation from worker node 102 that write buffer 112 has been erased prior to marking worker node 102 clean. In other examples, controller node 104 may assume write buffer 112 was erased (e.g., after a predefined period of time has elapsed since directing worker node 102 to erase write buffer 112) and mark worker node 102 clean without requiring a confirmative response. Once clean, write buffer 112 will not include data that could potentially corrupt data stored in storage volumes 161-163 but, instead, will include data processed subsequent to worker node 102's failure (e.g., data resulting from a processing task assigned after worker node 102 recovered).

Figure 3:
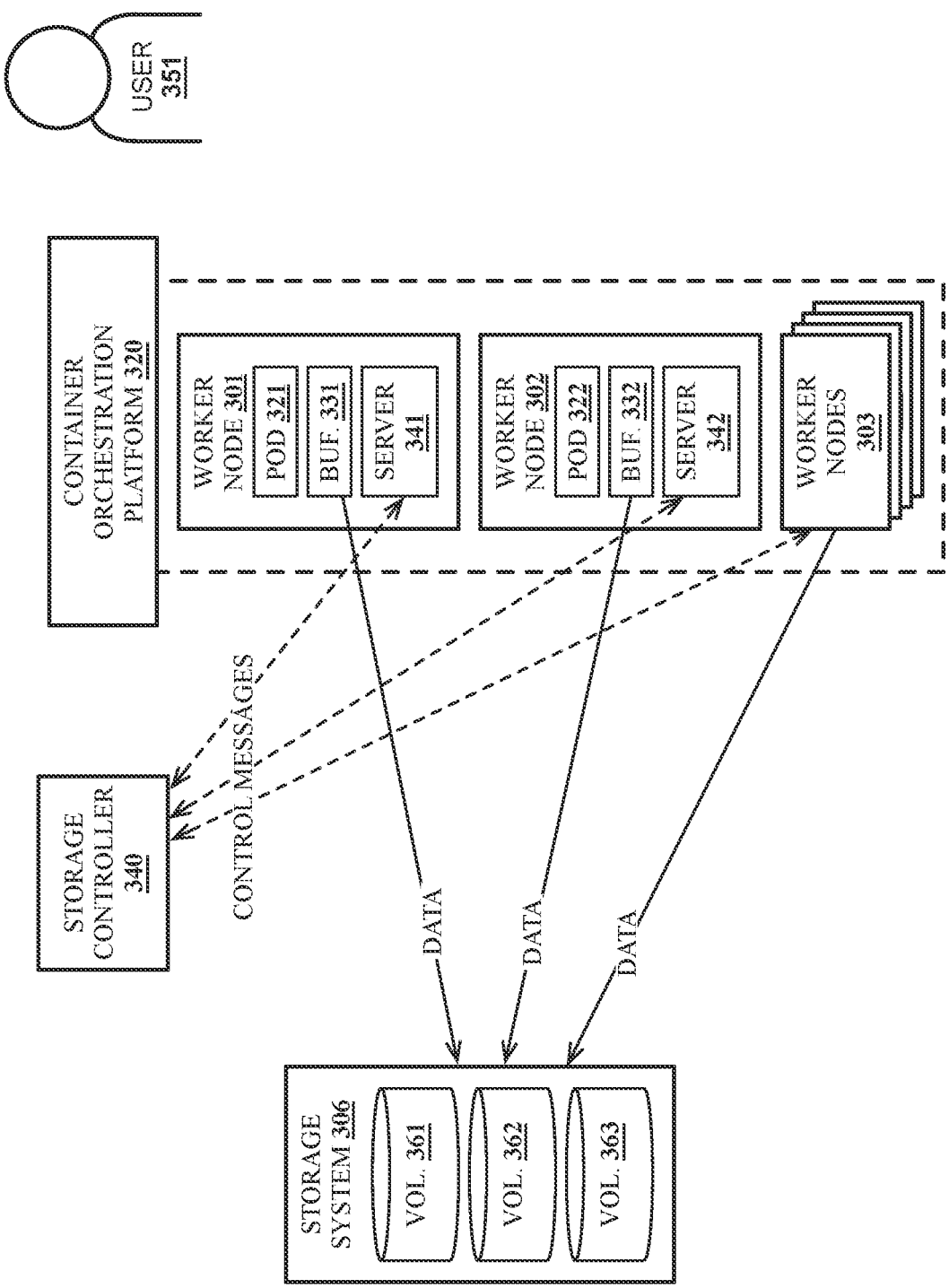
FIG. 3 illustrates an implementation for preventing residual data writes to storage volumes after a non-graceful node failure.

FIG. 3 illustrates implementation 300 for preventing residual data writes to storage volumes after a non-graceful node failure. Implementation 300 includes a cluster of worker nodes 301-303 controlled by container orchestration platform 320 and storage system 306 storing storage volumes 361-363. While not shown, storage system 306 may be a distributed storage system executing on storage nodes similar to storage nodes 152. Likewise, while not shown worker nodes 301-303 may nodes similar to computing nodes 151. Worker node 301 includes pod 321, write buffer 331, and storage orchestrator server 341. Worker node 302 includes pod 322, write buffer 332, and storage orchestrator server 342. Each of worker nodes 303 may also include one or more pods, a write buffer, and a storage orchestrator server.

In operation, container orchestration platform 320 manages which pods execute on which nodes and which processing tasks are performed by those pods. Kubernetes is an example container orchestration platform that uses pods but container orchestration platform 320 may be some other type of platform that uses pods. A Pod is the smallest deployable unit of computing in a Kubernetes cluster. A pod is a group of one or more containers that share the same host system (e.g., worker node in implementation 100). Container orchestration platform 320 may include components executing on each of worker nodes 301-303 to control different aspects of cluster management. For example, in Kubernetes, kubelets residing on each node within the cluster are responsible for managing the containers' lifecycle. They communicate with the Kubernetes API server to receive instructions about which containers to run, monitor their health, and ensure they are running as expected. Kubelets also manage networking, storage, and other node-specific tasks, ensuring proper resource allocation and utilization. Kubernetes servers, including the API server, controller manager, and scheduler, coordinate the overall operation of the cluster. The servers may also execute on one or more nodes in the cluster (e.g., on a dedicated Kubernetes controller node). The API server acts as the primary control plane component, serving as the endpoint for all administrative tasks and client interactions. The controller manager oversees the cluster's desired state, continuously reconciling any discrepancies to maintain system integrity. Meanwhile, the scheduler assigns workloads to appropriate nodes based on resource availability and constraints, optimizing performance and reliability across the cluster. Thus, in this example, a scheduler of container orchestration platform 320 may have directed worker node 301 to execute pod 321 and worker node 302 to execute pod 322.

Storage orchestrator controller 340 and storage orchestrator servers 341-342 are components of a storage orchestrator that provisions and controls access to storage volumes stored on storage system 306. Three storage volumes 361-363 are included in this example but other examples may involve different numbers of storage volumes. The storage orchestrator may also handle access to storage volumes stored on other storage systems not shown in implementation 300. NetApp Trident is an example storage orchestrator that uses servers like storage orchestrator servers 341-342 on the worker nodes in conjunction with a controller like storage orchestrator controller 340, but other storage orchestrators may use similar components. When a request for storage provisioning is initiated by a pod, storage orchestrator controller 340 communicates with the server (e.g., one of storage orchestrator servers 341-342) to gather information about available storage resources and assesses various factors such as storage class, capacity, and performance requirements specified by the user or application. Based on this information, storage orchestrator controller 340 makes informed decisions about whether to provision and mount a storage volume. The server then executes the necessary actions to create (if not already existing), attach, and mount the volume onto the appropriate node within the cluster. Storage orchestrator controller 340 may execute on one of worker nodes 301-303, on a controller node with a server of container orchestration platform 320, or on some other node in the cluster. Since storage orchestrator servers 341-342 interact with storage orchestrator controller 340 to when determining whether to mount a storage volume, storage orchestrator controller 340 is in a position to deny mounting of a storage volume when a node is marked dirty, as described below.

Figure 4:
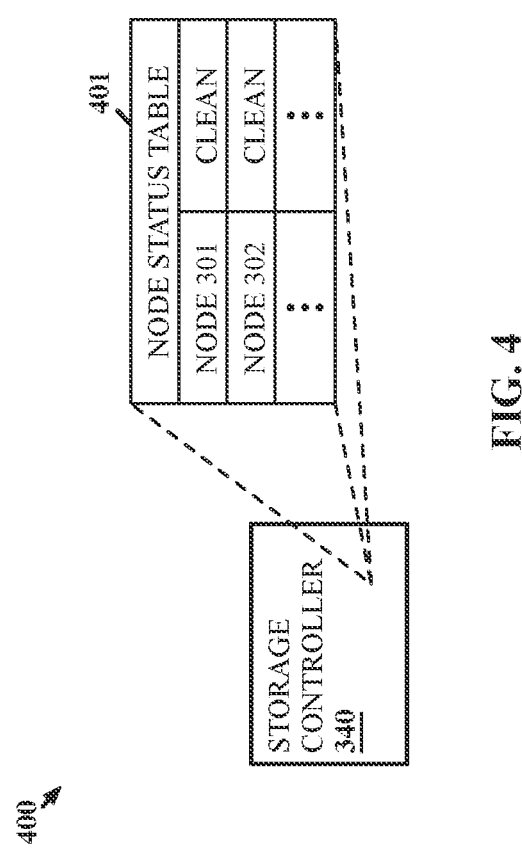
FIG. 4 illustrates an implementation of a storage orchestrator controller for preventing residual data writes to storage volumes after a non-graceful node failure.

FIG. 4 illustrates implementation 400 of storage orchestrator controller 340 for preventing residual data writes to storage volumes after a non-graceful node failure. In implementation 400, storage orchestrator controller 340 maintains node status table 401 therein to track the clean or dirty status of each of worker nodes 301-303. In other examples, additional status information may be tracked by node status table 401 rather than a simple binary clean or dirty status. For instance, there may be an in-between status representing when a node is unreachable but not yet determined to be out of service. Storage orchestrator controller 340 may perform one or more actions based on that in-between status as well.

While a table is used in this example, other types of data structures may be used in other examples. Storage orchestrator controller 340 references node status table 401 in the examples below to determine whether a node should be allowed to mount a storage volume. As shown in FIG. 4, both worker node 301 and worker node 302 are clean according to node status table 401. Worker nodes 303 can be considered clean for simplicity in this example). Should either storage orchestrator server 341 or storage orchestrator server 342 request mounting of one of storage volumes 361-363, storage orchestrator controller 340 will not deny the request due to either node being dirty (although, other reasons may exist for denying the mounting, such as worker node 301 or worker node 302 not being allowed to access a particular volume).

Figure 5:
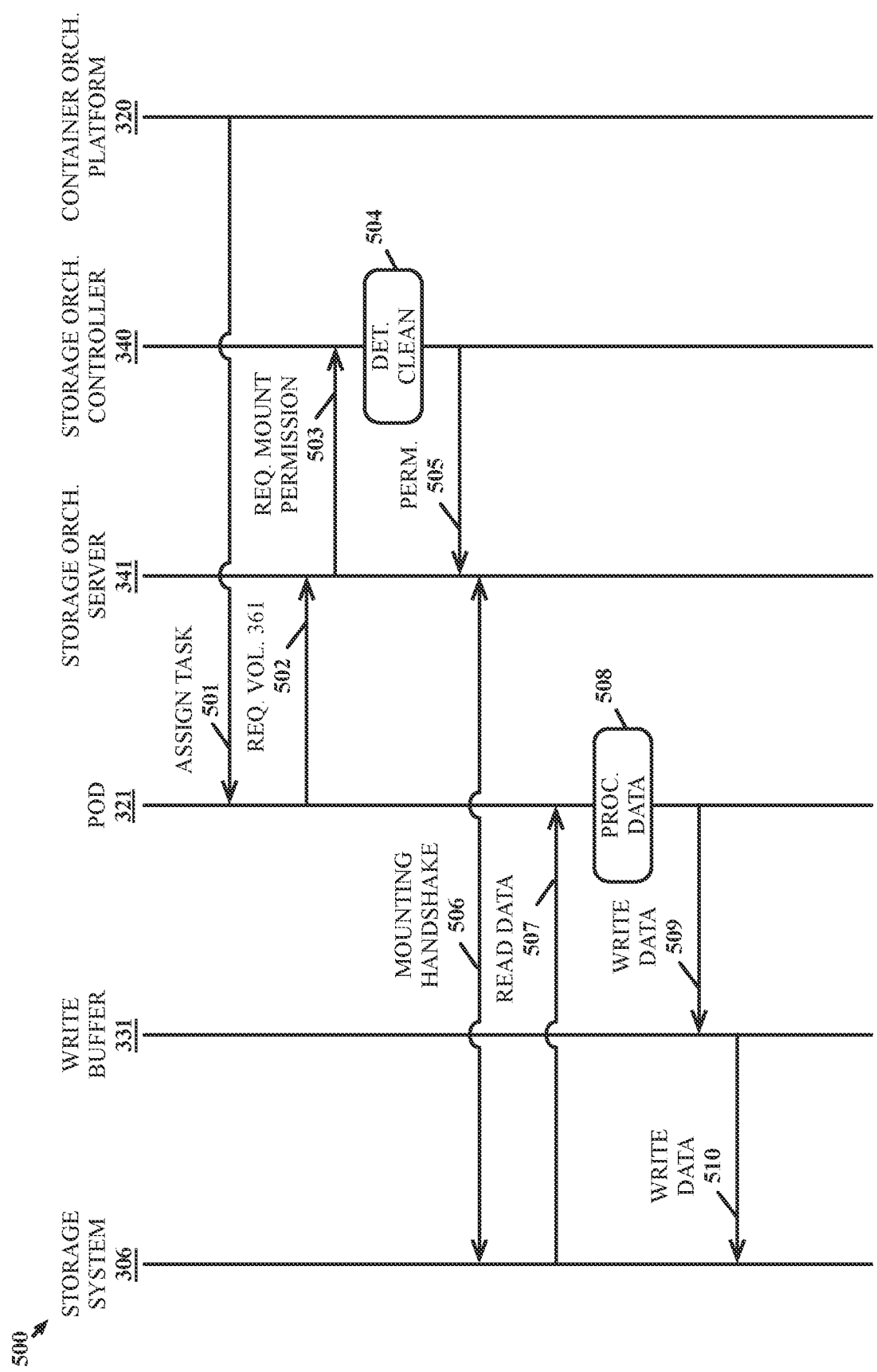
FIG. 5 illustrates an operational scenario for preventing residual data writes to storage volumes after a non-graceful node failure.

FIG. 5 illustrates operational scenario 500 for preventing residual data writes to storage volumes after a non-graceful node failure. Operational scenario 500 is an example where a clean node is allowed to mount a storage volume. In operational scenario 500, container orchestration platform 320 assigns a processing task to pod 321 (step 501). Pod 321 may already be executing on worker node 301 or container orchestration platform 320 may direct worker node 301 to execute pod 321. A scheduler component of container orchestration platform 320, specifically, may handle the assignment of the processing task. Container orchestration platform 320 may receive a request to handle the processing task from a user, from another system, or from some other source. Pod 321 determines that access to storage volume 361 is necessary for performing the processing task and requests storage orchestrator server 341 to mount storage volume 361 (step 502). Prior to mounting storage volume 361, storage orchestrator server 341 transmits a message to storage orchestrator controller 340 requesting permission to mount storage volume 361 (step 503).

In response to receiving the request message from storage orchestrator server 341, storage orchestrator controller 340 references node status table 401 to determine that worker node 301 is clean (step 504). There may be other reasons for storage orchestrator controller 340 to deny storage orchestrator server 341's request for permission to mount storage volume 361 but, for the purposes of this example, storage orchestrator controller 340 only considers whether worker node 301 is clean. In response to determining worker node 301 is clean, storage orchestrator controller 340 transmits a message to storage orchestrator server 341 indicating that storage orchestrator server 341 has permission to mount storage volume 361 (step 505). In response to receiving the permission from storage orchestrator controller 340, storage orchestrator server 341 performs a handshake with storage system 306 to mount storage volume 361 (step 506). The mounting handshake may depend on the protocol being used to access storage volume 361. The protocol may be Internet Small Computer System Interface (ISCSI), Nonvolatile Memory Express (NVMe), Network File System, or some other protocol for accessing data volumes over a network.

The handshake may include a series of actions to establish a connection between storage system 306 and worker node 301. Initially, storage orchestrator server 341 communicates with storage system 306 (sometimes referred to as the storage backend) to retrieve information about the available volumes (storage volumes 361-363 in this case) and their configurations. Upon selection of the desired volume (storage volume 361 in this example), storage orchestrator server 341 coordinates with the underlying infrastructure of container orchestration platform 320 at worker node 301 to mount the volume onto the worker node. This process may involve creating the necessary file system structure and establishing a secure channel for data transfer between worker node 301 and storage system 306. Once storage volume 361 is successfully mounted, it becomes accessible to pod 321, or other processes running on worker node 301, enabling storage volume 361 to read from and write to storage volume 361.

After completing the handshake, pod 321 reads data from storage volume 361 over the connection created during the handshake (step 507). In other examples, the data processed by pod 321 may be received from elsewhere. Pod 321 processes the received data (step 508). To write data resulting from the processing to storage volume 361, pod 321 passes the resulting data to write buffer 331 (step 509). In some examples, the data may be automatically placed in write buffer 331 when pod 321 directs worker node 301 to send the data to storage system 306 for storage. In other examples, pod 321 may explicitly write the data into write buffer 331. When the data is next up for removal from write buffer 331, worker node 301 transmits the data to storage system 306 for storage in storage volume 361 (step 510). While data is read from and written to storage volume 361 in this example, the data may be written to a different storage volume than the storage volume from which the data was read.

Figure 6:
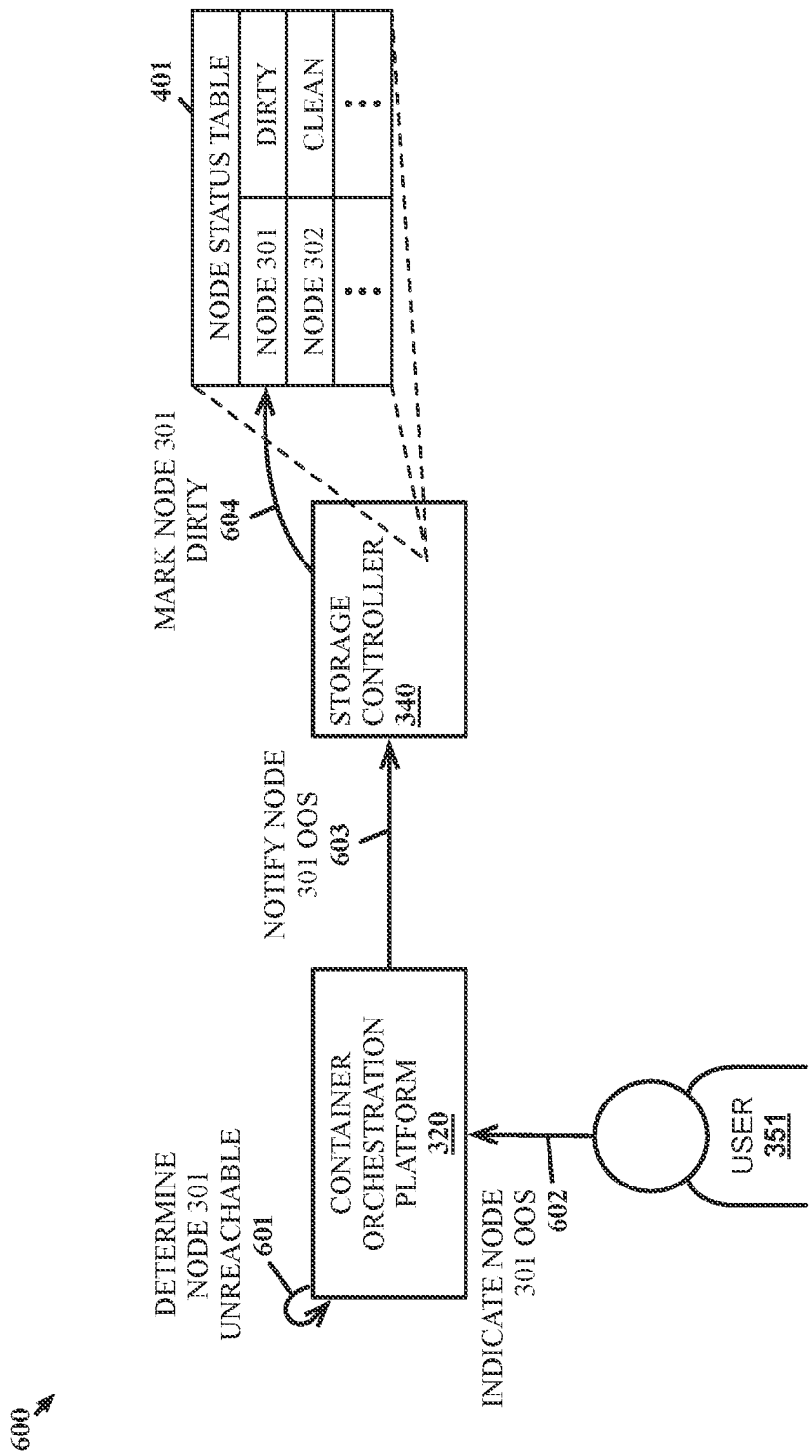
FIG. 6 illustrates an operational scenario for preventing residual data writes to storage volumes after a non-graceful node failure.

FIG. 6 illustrates operational scenario 600 for preventing residual data writes to storage volumes after a non-graceful node failure. Operational scenario 600 is an example of how storage orchestrator controller 340 may determine that a node is dirty. While operational scenario 600 covers a determination that worker node 301 is dirty, a similar process may be used by storage orchestrator controller 340 when determining worker node 302 or one of worker nodes 303 is dirty. While container orchestration platform 320 may be able to determine a node is unreachable, container orchestration platform 320 is not necessarily capable of determining whether the node is out of service. Although, in other examples, container orchestration platform 320 may have such capability (e.g., container orchestration platform 320 may be able to determine whether a physical connection with worker node 301 still exists) or container orchestration platform 320 may assume worker node 301 is dirty when it becomes unreachable.

In this example, container orchestration platform 320 determines worker node 301 is unreachable (step 601). Container orchestration platform 320 may use a heartbeat mechanism where each of worker nodes 301-303 sends a signal (e.g., sending a message over a network periodically or on a predetermined schedule), indicating the node's health and status. If container orchestration platform 320 fails to receive the expected signal within a specified timeframe, container orchestration platform 320 considers the node unresponsive. Additionally, or instead of heartbeats, container orchestration platform 320 may conduct active probing by sending requests (e.g., periodically, on a predetermined schedule, or on-demand) to the network interfaces of worker nodes 301-303 and verifying the responses. If consecutive probes fail or if the node fails to satisfy certain readiness criteria, such as running essential components of container orchestration platform 320 or responding to API calls, the node is marked as unreachable.

Since container orchestration platform 320 is unaware of what caused worker node 301 to become unreachable, container orchestration platform 320 does not reschedule the processing task that pod 321 was performing. Container orchestration platform 320 may wait to reschedule the processing task to another worker node to give worker node 301 a chance to regain connectivity to the cluster. In other examples, container orchestration platform 320 may wait a predefined period of time before rescheduling the task and marking worker node 301 as out of service. In this example, user 351 indicates via user input that worker node 301 is out of service (step 602). User 351 may be an administrator of the cluster and may have physical access to the computing hardware that is worker node 301. User 351 may have noticed that worker node 301 is out of service during a routine check of the computing systems under their supervision or container orchestration platform 320 may notify user 351 that worker node 301 is unreachable, which triggered user 351 to investigate the issue. User 351 may operate a user system (e.g., personal computer, laptop, smartphone, tablet, etc.) having a software interface to container orchestration platform 320 and the software interface may provide user 351 with the ability to indicate out of service nodes to container orchestration platform 320.

In this example, container orchestration platform 320 notifies storage orchestrator controller 340 that worker node 301 is out of service in response to user 351's indication (step 603). User 351's indication may also be the trigger for container orchestration platform 320 to reschedule the processing task that was assigned to pod 321. In a Kubernetes example, the rescheduling process may evict pod 321 from worker node 301 and reassign it to another node. However, since worker node 301 is unreachable, the kubelet on worker node 301 will not be aware of the eviction since it cannot communicate with the Kubernetes API server to receive instructions and updates therefrom. The kubelet will continue to manage pod 321 as it did before the disconnection occurred and maintain the existing state of pod 321 (along with any other pods that may be executing on worker node 301 in other examples) in an attempt to keep pod 321 running as long as possible. The kubelet cannot make any changes to the pod state on worker node 301, such as starting new pods or terminating existing ones, because it lacks communication with the Kubernetes server. Should pod 321 still be running, data from pod 321 may be placed in write buffer 331 for writing to storage volume 361 when connection is reestablished therewith. Thus, even when the Kubelet regains communication with the Kubernetes server to be informed that pod 321 has been reassigned, data may have already been pushed to write buffer 331 after pod 321 was evicted from the perspective of the Kubernetes server.

In response to the notification from container orchestration platform 320 that worker node 301 is out of service, storage orchestrator controller 340 marks node worker node 301 as dirty in node status table 401 (step 604). Worker node 301 is marked as dirty even though storage orchestrator controller 340 does not know the reason for worker node 301 being out of service. Worker node 301 may be out of service due to a power failure, which would likely cause write buffer 331 to be erased unless stored in a type of persistent memory that survives power failure. Even so, storage orchestrator controller 340 will mark worker node 301 as dirty to ensure write buffer 331 gets erased if data still exists therein.

Figure 7:
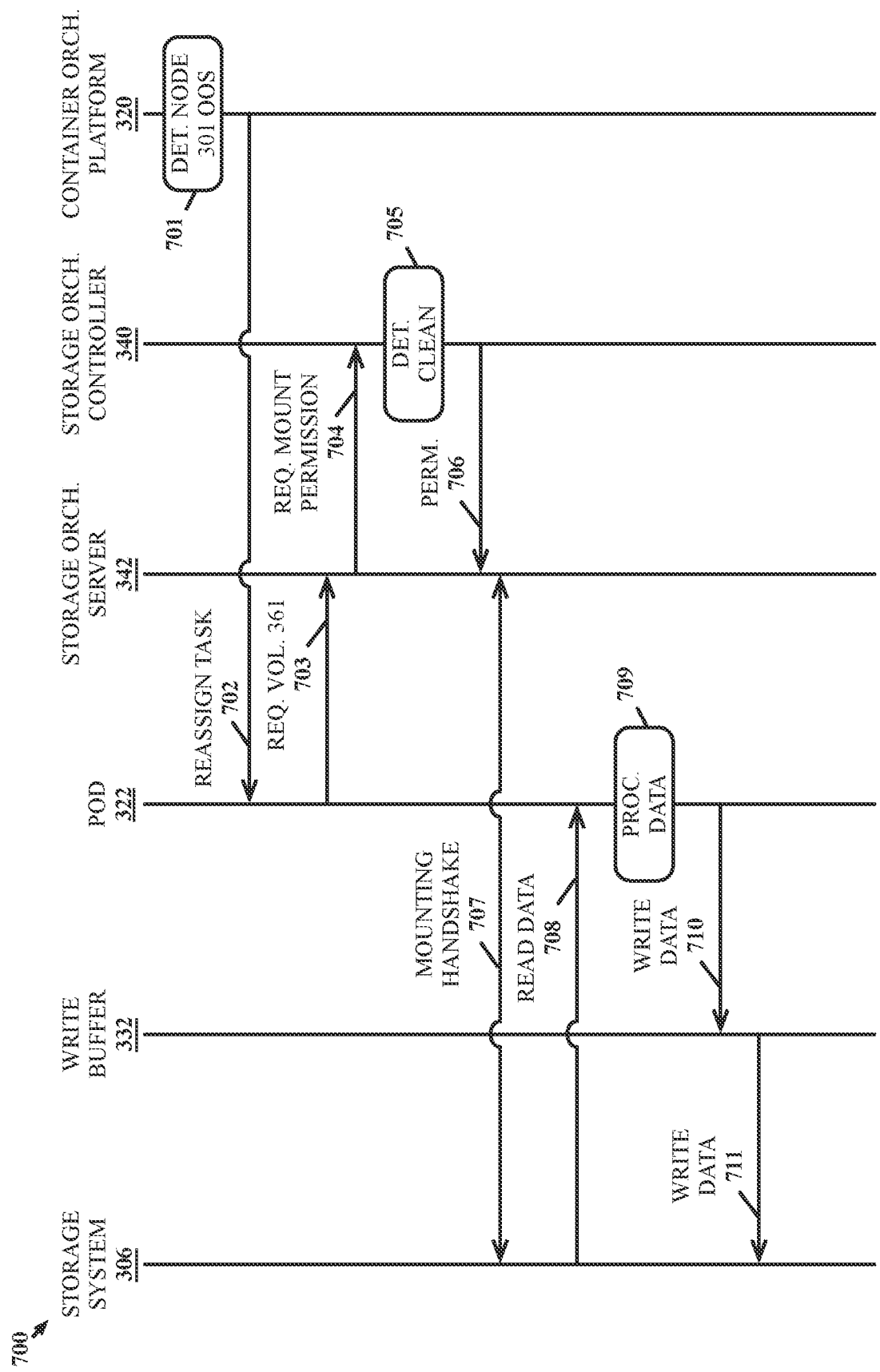
FIG. 7 illustrates an operational scenario for preventing residual data writes to storage volumes after a non-graceful node failure.

FIG. 7 illustrates operational scenario 700 for preventing residual data writes to storage volumes after a non-graceful node failure. Operational scenario 700 is an example where the processing task that was running on worker node 301 at the time worker node 301 went out of service is reassigned to worker node 302. Container orchestration platform 320 determines worker node 301 is out of service (step 701). Container orchestration platform 320 received an indication that worker node 301 is out of service from user 351 per operational scenario 600 in this example. Container orchestration platform 320 may determine worker node 301 is out of service in different manners. In response to determining worker node 301 is out of service, container orchestration platform 320 evicts pod 321 from worker node 301 and reassigns the processing task to pod 322 on worker node 302 (step 702). Pod 322 may already be executing on worker node 302 when assigned the processing task by container orchestration platform 320 or container orchestration platform 320 may direct worker node 302 to execute pod 322. In some examples, pod 322 may be a replica of pod 321 to handle the processing task that was being handled by pod 321.

Like pod 321 before, pod 322 requests access to storage volume 361 so pod 322 can continue the processing task (step 703). Pod 322 may continue the processing task from where pod 321 left off, at least as far as container orchestration platform 320 is able to determine, pod 322 may start from a most progress point reached by pod 321 prior to going out of service, or pod 322 may restart the processing task from the beginning. In at least some of these examples, pod 322 may process and produce data already produced by pod 321 prior to going out of service, which may cause pod 322 to overwrite data task previously generated by pod 321 in storage volume 361 (or the previously generated data may remain in storage volume 361). Storage orchestrator server 342 requests permission from container orchestration platform 320 to mount pod 321 (step 704). In response to the request, storage orchestrator controller 340 references node status table 401 to determine that worker node 302 is clean (step 705) and grant permission to storage orchestrator server 342 (step 706). Storage orchestrator server 342 performs the mounting handshake (step 707) and, upon completion of the mounting, pod 322 reads data from storage volume 361 over the established connection with storage system 306 (step 708). Pod 322 processes the received data (step 709) and writes the resulting data to write buffer 332 to get written to storage volume 361 (step 710). When the data is next out of write buffer 332, worker node 302 writes the data to storage volume 361 in storage system 306 (step 711).

Figure 8:
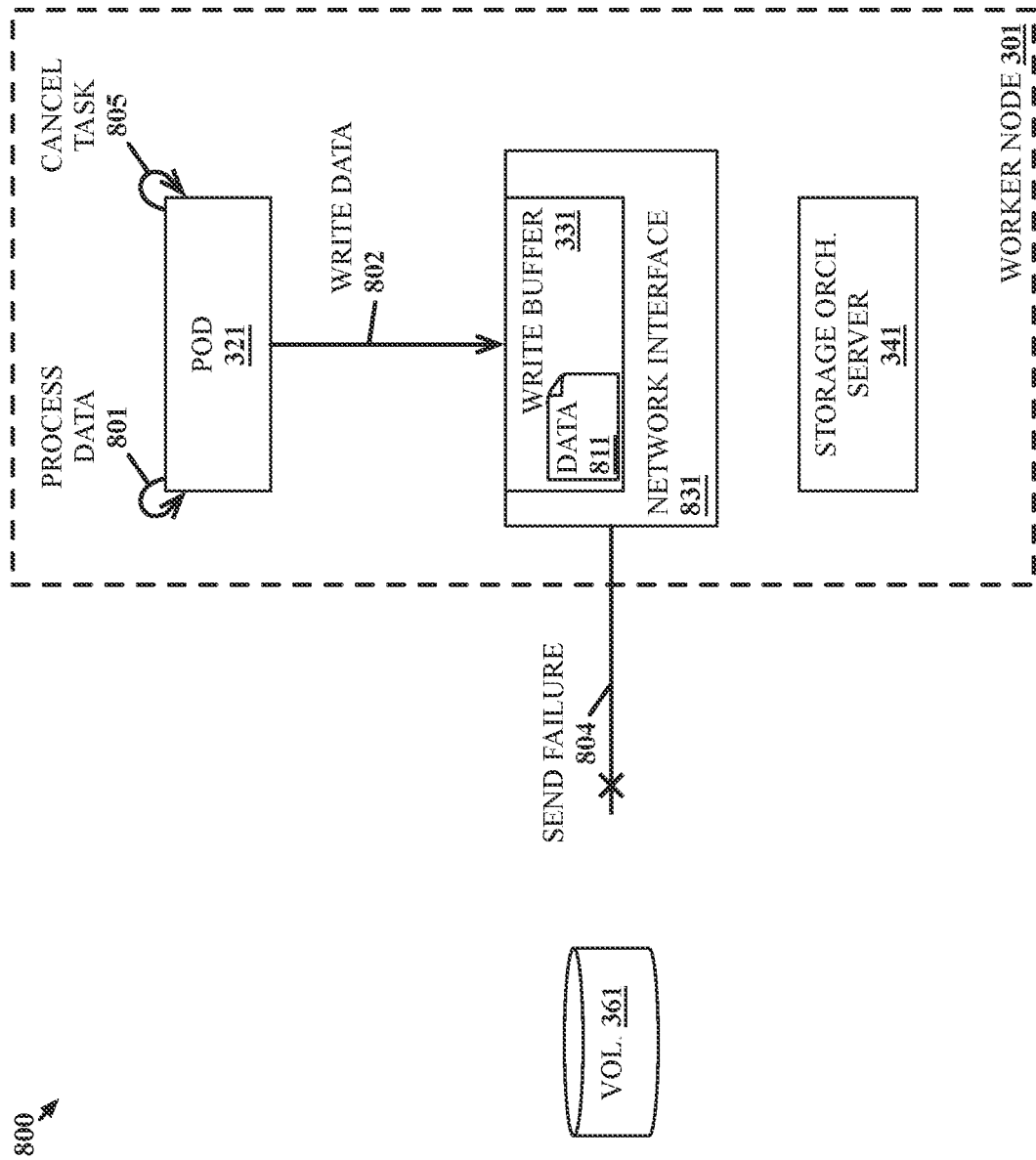
FIG. 8 illustrates an operational scenario for preventing residual data writes to storage volumes after a non-graceful node failure.

FIG. 8 illustrates operational scenario 800 for preventing residual data writes to storage volumes after a non-graceful node failure. In operational scenario 800, write buffer 331 is a part of network interface 831. Network interface 831 is a network interface of worker node 301. Worker node 301 includes circuitry for communicating over a communication network to exchange data with storage system 306. Since network interface 831 may not be able to send all data right away to storage volume 361 (e.g., due to bandwidth limitations or connection issues), write buffer 331 exists to store data until the data can be sent. Operational scenario 800 is an example of how data can end up stuck in write buffer 331 upon worker node 301 failing. The data being stuck in write buffer 331 makes worker node 301 a dirty node.

In operational scenario 800, pod 321 processes data received from storage volume 361 (step 801). Although, the data being processed by pod 321 may be received from some other source(s) in other examples. Data that results from the processing (e.g., output from the processing performed by pod 321) is sent by pod 321 to network interface 831, which stores the data as data 811 in write buffer 331 (step 802). Data 811 cannot leave write buffer 331 network interface 831 cannot send data to storage system 306 (step 804). The send failure in this example is caused by a network disconnect with worker node 301. A network disconnect does not result in a power failure, or other situation, that would cause write buffer 331 to be cleared inherently. Therefore, data 811 remains in write buffer 331 despite the disconnection because network interface 831 is configured to send data in write buffer 331 when a connection is reestablished.

In the meantime, worker node 301 is marked out of service, as described above. Thus, container orchestration platform 320 reassigned the processing task being performed by pod 321. When connectivity returns to worker node 301, container orchestration platform 320 notifies worker node 301 that the processing task of pod 321 is reassigned and pod 321 cancels processing of the task (step 805). In Kubernetes, canceling the task may involve evicting pod 321 from worker node 301 and notifying worker node 301 of the eviction when connectivity is reestablished between container orchestration platform 320 and worker node 301. Regardless of how the task is canceled, pod 321 will stop sending data to network interface 831 but data 811 still remains.

Figure 9:
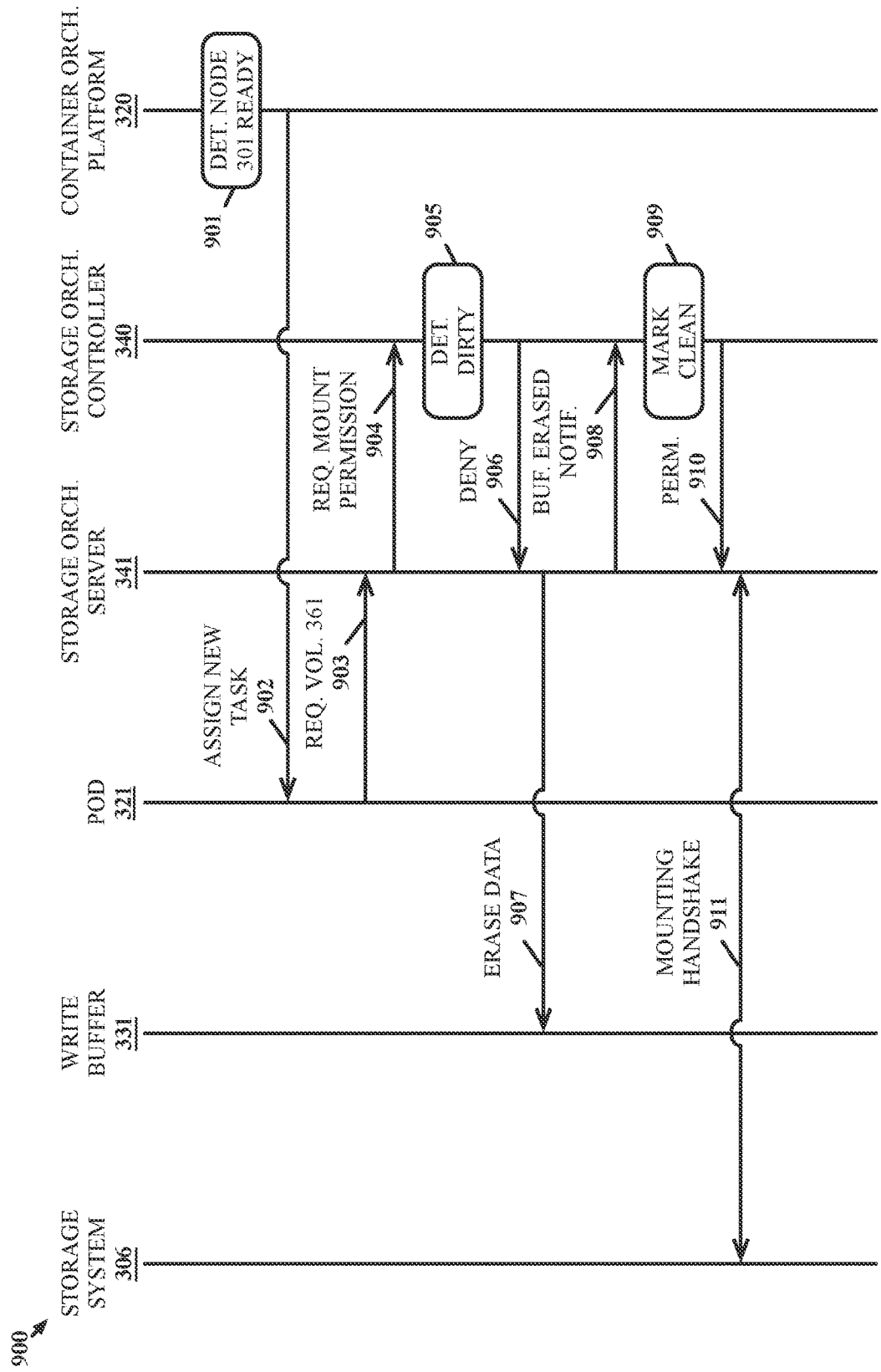
FIG. 9 illustrates an operational scenario for preventing residual data writes to storage volumes after a non-graceful node failure.

FIG. 9 illustrates operational scenario 900 for preventing residual data writes to storage volumes after a non-graceful node failure. Operational scenario 900 is an example of what may happen when worker node 301 become ready after being unresponsive and marked out of service by container orchestration platform 320. In operational scenario 900, container orchestration platform 320 determines that worker node 301 is ready (step 901). Container orchestration platform 320 may determine worker node 301 is ready when container orchestration platform 320 receives a message from worker node 301 indicating worker node 301 is ready, user 351 may indicate that worker node 301 is ready, or some other even may be detected by container orchestration platform 320 indicating worker node 301 is ready to handle processing tasks again.

After determining worker node 301 is ready, container orchestration platform 320 assigns a new processing task to pod 321 (step 902). Pod 321 is still the same pod that was executing on worker node 301 before it went out of service but, in some examples, the new processing task may be assigned to a new pod. In this example, the new processing task also requests access to storage volume 361 from storage orchestrator server 341 (step 903). As in the scenarios above, storage orchestrator server 341 requests permission to mount storage volume 361 from storage orchestrator controller 340 (step 904). In response to the request, storage orchestrator controller 340 references node status table 401 to determine worker node 301 is dirty as per the update to node status table 401 performed in operational scenario 600 (step 905). Since worker node 301 is marked as dirty, storage orchestrator controller 340 knows worker node 301 could have data in write buffer 331 that should not be written to storage volume 361. In this case, write buffer 331 does include data 811 but, even if write buffer 331 did not retain any data, worker node 301 would still be marked as dirty just in case. Due to worker node 301 being dirty, storage orchestrator controller 340 denies storage orchestrator server 341's request (step 906).

In response to the denial, storage orchestrator server 341 erases write buffer 331 to ensure no residual data remains therein when storage volume 361 gets mounted to worker node 301 (step 907). Erasing write buffer 331 erases data 811 from write buffer 331. The denial from storage orchestrator controller 340 may explicitly direct worker node 301 to erase write buffer 331 or storage orchestrator server 341 may be configured to erase write buffer 331 (and any other write buffers at worker node 301) whenever a denial is received. Alternatively, the instruction from storage orchestrator controller 340 to erase write buffer 331 may be transmitted separately from a message denying the request.

In this example, storage orchestrator server 341 reports back to storage orchestrator controller 340 after erasing write buffer 331 to notify storage orchestrator controller 340 that the erasure has been completed as directed (step 908). Knowing that worker node 301 no longer includes dirty data that could adversely affect storage volume 361, storage orchestrator controller 340 updates node status table 401 to mark worker node 301 as clean (step 909). Since worker node 301 is now clean, storage orchestrator controller 340 grants storage orchestrator server 341 permission to mount storage volume 361 (step 910). In this example, storage orchestrator controller 340 automatically grants the permission once worker node 301 is marked clean but, in other examples, storage orchestrator controller 340 may wait for another request for permission to mount storage volume 361 from storage orchestrator server 341. In those other examples, storage orchestrator controller 340 may reference node status table 401 again to find that worker node 301 is clean before sending a message granting the permission to storage orchestrator server 341. In response to receiving the permission, storage orchestrator server 341 performs a mounting handshake with storage system 306 to mount storage volume 361 to worker node 301 (step 911).

In this example, storage orchestrator server 341 waits until a request is made by pod 321 before requesting storage volume 361 be mounted. In other examples, storage orchestrator server 341 may recognize that data in write buffer 331 is intended for a particular storage volume and requests permission to mount that storage volume so the data can be written from write buffer 331. Of course, even if requesting at that earlier time, storage orchestrator controller 340 will deny the permission request due to worker node 301 being dirty.

While the new task in operational scenario 900 requests mounting of storage volume 361, the new task may request mounting of another storage volume in some examples. In those examples, even though data 811 is destined for a different storage volume than the one requested for the new processing task, worker node 301 is still marked as dirty and will erase data 811 from write buffer 331 regardless. Thus, should worker node 301 mount storage volume 361 at any point in the future, data 811 will not be written to storage volume 361.

Figure 10:
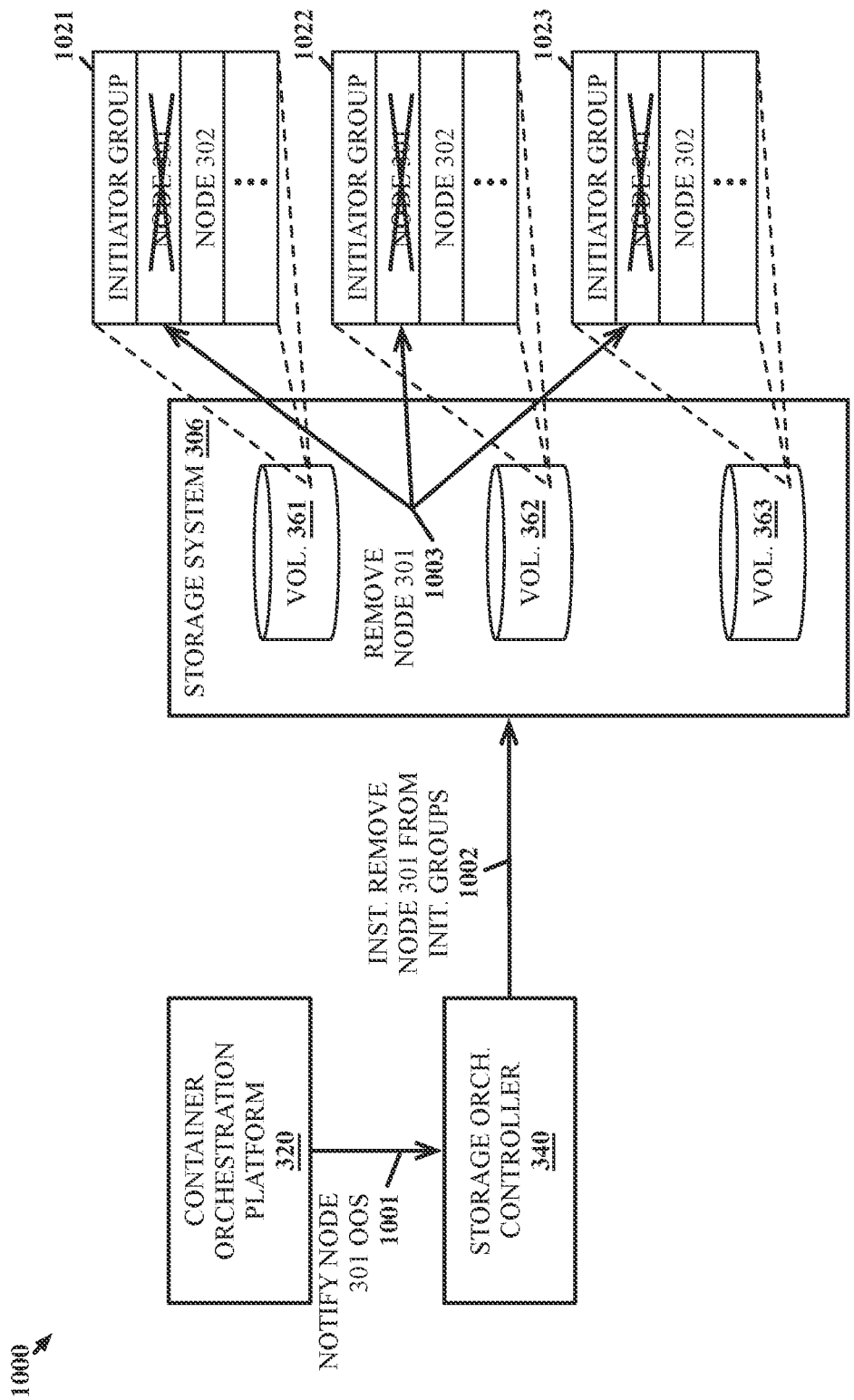
FIG. 10 illustrates an operational scenario for preventing residual data writes to storage volumes after a non-graceful node failure.

FIG. 10 illustrates operational scenario 1000 for preventing residual data writes to storage volumes after a non-graceful node failure. Operational scenario 1000 is an example of how storage system 106 may be tasked with preventing the mounting of storage volumes to a dirty node. Like in operational scenario 600, container orchestration platform 320 notifies storage orchestrator controller 340 that worker node 301 is out of service (step 1001). In addition to storage orchestrator controller 340 marking worker node 301 as dirty in node status table 401, as is done in operational scenario 600, storage orchestrator controller 340 sends a message to storage system 306 instructing storage system 306 to remove worker node 301 from initiator groups of storage volumes 361-363 (step 1002).

An initiator group is used for iSCSI connections to organize and manage initiators of the connections (worker nodes in this case) that are allowed to access a specific set of iSCSI targets, such storage volumes 361-363. Storage volumes in iSCSI are commonly identified by their unique LUNs (Logical Unit Numbers). By grouping initiators together, administrators can apply access control policies more efficiently, ensuring that only authorized hosts can establish connections to designated storage resources. Storage orchestrator controller 340 leverages the initiator groups in this example to further ensure a dirty node is not able to access storage volumes 361-363. While initiator groups are used to fence off requests from dirty nodes in iSCSI, other protocols may use different mechanisms. For example, NFS uses an export list specifying which client systems are allowed to access specific directories or file systems on the NFS storage system and, if storage system 306 uses NVMe, the NVMe subsystem of storage system 306, which manages communication with NVMe devices, the NVMe subsystem may be configured to only allow access to certain nodes.

In response to the instruction, storage system 306 removes worker node 301 from initiator group 1021 for storage volume 361, initiator group 1022 for storage volume 362, and initiator group 1023 for storage volume 363 (step 1003). As such, should storage system 306 receive a handshake request from worker node 301 to access any of storage volumes 361-363, storage system 306 will decline the requests due to worker node 301 not being listed in the initiator groups for storage volumes 361-363. As shown in initiator groups 1021-1023, should worker node 302 request mounting with storage volumes 361-363, storage system 306 would allow the handshake to occur due to worker node 302 being listed in initiator groups 1021-1023. When storage orchestrator controller 340 marks node as being clean, as in step 909, storage orchestrator controller 340 may also instruct storage system 306 to add worker node 301 back to initiator groups 1021-1023 so that worker node 301 can request access to storage volume 361 again.

Figure 11:
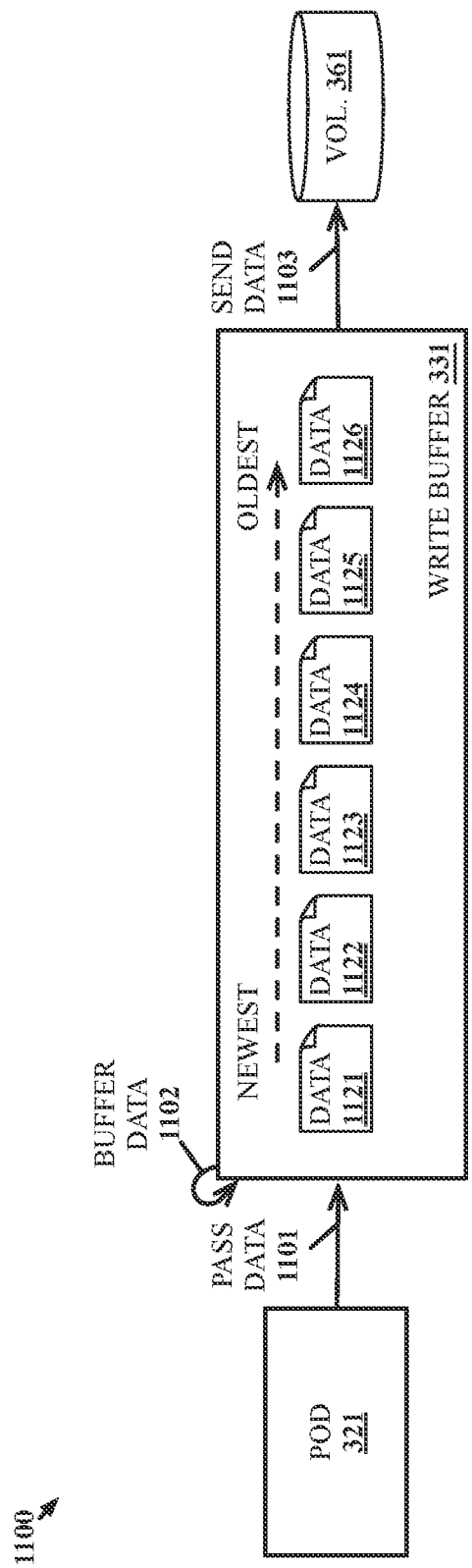
FIG. 11 illustrates an operational scenario for preventing residual data writes to storage volumes after a non-graceful node failure.

FIG. 11 illustrates operational scenario 1100 for preventing residual data writes to storage volumes after a non-graceful node failure. Operational scenario 1100 is an example for how write buffer 331 may buffer data generated by write buffer 331 when pod 321 is performing a processing task. In operational scenario 1100, pod 321 passes data for storage in storage volume 361 to write buffer 331 (step 1101). Pod 321 may explicitly pass to write buffer 331 (e.g., direct the data to an address of write buffer 331), may make a system call (e.g., to a network interface) to send the data and a system component associated with that call may place the data in write buffer 331, or write buffer 331 may end up in write buffer 331 on the way to being stored in storage volume 361 by some other mechanism.

Upon receiving the data, write buffer 331 buffers the received data therein (step 1102). In this example, write buffer 331 is a FIFO buffer where the oldest data in write buffer 331 is transmitted first. Write buffer 331 currently includes data 1121-1126 with data 1121 being the most recently written (i.e., newest data) in write buffer 331 and data 1126 being the oldest. Each of data 1121-1126 may be a bit, a byte, a block, a page, a file, or some other unit of data-including combinations thereof. When worker node 301 is ready to write more data to storage volume 361, data 1126 is sent before any of data 1121-1125 (step 1103). After data 1126 is sent, data 1125 is next up for sending from write buffer 331 because data 1125 is now the oldest data in write buffer 331.

If worker node 301 becomes unresponsive (but still powered such that write buffer 331 can maintain data stored therein) after data 1121 is written to write buffer 331 and before data 1126 is sent from write buffer 331, then data 1121-1126 may remain in write buffer 331 until worker node 301 can reconnect to the cluster. Data 1121-1126 may be data 811 in the example from operational scenario 800 where worker node 301 cannot send data 811. Should worker node 301 reconnect and mount storage volume 361 prior to being erased, then data 1121-1126 may be written from write buffer 331 to storage volume 361. If the data process that generated storage volume 361 was reassigned while worker node 301 was unresponsive, writing data 1121-1126 to storage volume 361 may cause issues with the data on storage volume 361. Thus, storage orchestrator controller 340, as described above, will direct storage orchestrator server 341 to erase data 1121-1126 from write buffer 331 prior to mounting of storage volume 361.

FIG. 12 illustrates a computing system 1200 for preventing residual data writes to storage volumes after a non-graceful node failure. Computing system 1200 is representative of any computing system or systems with which the various operational architectures, processes, scenarios, and sequences disclosed herein can be implemented. Computing system 1200 is an example architecture for computing nodes 151 and storage nodes 152, although other examples may exist. Computing system 1200 includes storage system 1245, processing system 1250, and communication interface 1260. Processing system 1250 is operatively linked to communication interface 1260 and storage system 1245. Communication interface 1260 may be communicatively linked to storage system 1245 in some implementations. Computing system 1200 may further include other components such as a battery and enclosure that are not shown for clarity.

Communication interface 1260 comprises components that communicate over communication links, such as network cards, ports, radio frequency (RF), processing circuitry and software, or some other communication devices. Communication interface 1260 may be configured to communicate over metallic, wireless, or optical links. Communication interface 1260 may be configured to use Time Division Multiplex (TDM), Internet Protocol (IP), Ethernet, optical networking, wireless protocols, communication signaling, or some other communication format-including combinations thereof. Communication interface 1260 may be configured to communicate with other computing systems via one or more networks.

Processing system 1250 comprises microprocessor and other circuitry that retrieves and executes operating software from storage system 1245. Storage system 1245 may include volatile and nonvolatile, removable, and non-removable media implemented in any method or technology for storage of information, such as computer readable instructions, data structures, program modules, or other data. Storage system 1245 may be implemented as a single storage device but may also be implemented across multiple storage devices or sub-systems. Storage system 1245 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no interpretations would storage media of storage system 1245, or any other computer-readable storage medium herein, be considered a transitory form of signal transmission (often referred to as "signals per se"), such as a propagating electrical or electromagnetic signal or carrier wave.

Processing system 1250 is typically mounted on a circuit board that may also hold the storage system. The operating software of storage system 1245 comprises computer programs, firmware, or some other form of machine-readable program instructions. The operating software of storage system 1245 comprises storage orchestrator 1230. The operating software on storage system 1245 may further include an operating system, utilities, drivers, network interfaces, applications, or some other type of software. When read and executed by processing system 1250 the operating software on storage system 1245 directs computing system 1200 to network routing advertisements as described herein. Storage orchestrator 1230 may execute natively on processing system 1250 or the operating software may include virtualization software, such as a hypervisor, to virtualize computing hardware on which storage orchestrator 1230 executes.

As described above, the storage orchestrator includes a storage orchestrator controller and storage orchestrator servers. Storage orchestrator 1230 may comprise one or both of those components (e.g., one storage orchestrator server on a worker node may also be configured to be the storage orchestrator controller). In at least one example, storage orchestrator 1230 executes on processing system 1250 and directs processing system 1250 to determine a health status of nodes in the cluster and, in response to determining a node in the cluster failed, mark the node as dirty. After marking the node as dirty and in response to determining the node is ready, storage orchestrator 1230 instructs processing system 1250 to direct the node to erase data in one or more write buffers at the node. The one of more write buffers buffer data for writing to one or more storage volumes when the one or more storage volumes are mounted by the node. After the one or more write buffers are erased, storage orchestrator 1230 directs processing system 1250 to mark the node as clean.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for protecting data from a non-graceful node failure in a cluster of computing nodes, the method comprising:
in response to determining a node in the cluster failed, marking the node as dirty;
after marking the node as dirty and in response to determining the node is ready, directing the node to erase data in one or more write buffers at the node, wherein the one or more write buffers buffer data for writing to one or more storage volumes when the one or more storage volumes are mounted by the node; and
after the one or more write buffers are erased, marking the node as clean.

2. The method of claim 1, comprising:
after marking the node as clean, mounting a storage volume of the one or more storage volumes to the node.

3. The method of claim 1, wherein determining a node in the cluster failed comprises:
receiving a failure notification from an orchestration platform for the cluster, wherein the failure notification occurs when a user marked the node as out of service in the orchestration platform.

4. The method of claim 1, wherein the one or more storage volumes are stored in a storage system that uses initiator groups, wherein marking the node as dirty includes removing the node from an initiator group of the one or more storage volumes.

5. The method of claim 1, wherein directing the node to erase the data comprises:
receiving a mounting request from the node; and
declining the mounting request due to the node being marked as dirty.

6. The method of claim 5, wherein declining the mounting request comprises:
transmitting a notification to the node indicating the node is marked as dirty, wherein the node automatically erases the data in the one or more write buffers responsive to the notification.

7. The method of claim 1, wherein marking the node as clean comprises:
receiving confirmation from the node indicating the data has been erased from the one or more write buffers; and
transmitting a notification to the node indicating the node is now clean.

8. The method of claim 7, comprising:
after transmitting the notification, receiving a mounting request from the node, wherein the mounting request requests a storage volume other than the one or more storage volumes.

9. The method of claim 1, wherein determining the node is ready comprises:
receiving a ready notification from an orchestration platform for the cluster indicating the node is ready, wherein the orchestration platform assigns processes to those of the nodes in the cluster that are ready, wherein at least one of the processes added the data to the one or more write buffers.

10. The method of claim 9, wherein the orchestration platform assigns one or more new instances of the processes to the node after the orchestration platform determines the node is ready.

11. A system for protecting data from a non-graceful node failure in a cluster of computing nodes, the system comprising:
a storage system storing a plurality of storage volumes;
a controller for a storage orchestrator executing on a controller node of the computing nodes; and
a plurality of servers for the storage orchestrator executing on a plurality of the computing nodes, wherein the plurality of computing nodes is configured to execute one or more pods that access the storage system, wherein,
the controller is configured to determine a node in the cluster has failed and mark the node as dirty;
a server of the plurality of servers executing on the node is configured to send, to the controller, a request for mounting of a storage volume of the plurality of storage volumes while the node is marked as dirty,
the controller is configured to reject the request and direct the server to erase a write buffer on the node, and
the server is configured to erase the write buffer in response to direction from the controller.

12. The system of claim 11, wherein:
a pod executing on the node writes data to the write buffer prior to the node failing, wherein a cause of the node failure allows the data to remain in the write buffer.

13. The system of claim 11, wherein:
a new pod is assigned to the node upon the node becoming ready; and
in response to the new pod directing the server to mount the storage volume, the server sends the request to the controller.

14. The system of claim 13, wherein:
the controller is configured to notify the server that the node is now marked as clean;
the server is configured to send a second request to mount the storage volume in response to being notified; and
the controller is configured to allow the server to mount the storage volume in response to the second request.

15. The system of claim 11, wherein the system includes:
a pod orchestrator executing in the cluster, wherein the pod orchestrator is configured to determine the node is unreachable and, in response to user input indicating the node is out of service, notify the controller that the node has failed.

16. The system of claim 11, wherein:
in response to user input indicating the node is out of service, the pod orchestrator is configured to reassign processing tasks from the node to one or more pods executing on one or more other nodes in the cluster; and
the one or more pods configured to write data that was included in the write buffer to the storage system.

17. A method comprising:
executing a pod on a computing node in a cluster, wherein a container orchestration platform manages pod execution across the cluster;
receiving an indication that a pod has failed due to the computing node being out of service; and
after receiving the indication:
reassigning a processing task for the pod to another pod on another computing node in the cluster; and
rejecting a storage volume mounting request due to the processing task having been reassigned.

18. The method of claim 17, comprising:
after receiving the indication, directing the computing node to erase remaining data to be written to a storage volume from the pod; and
mounting a storage volume to the computing node after directing the computing node to erase the remaining data.

19. The method of claim 17, wherein a portion of the processing task already performed but not written to a storage volume by the pod is repeated by the other pod.

20. The method of claim 17, comprising:
- after receiving the storage volume mounting request, receiving a second storage volume mounting request;
- in response to the second storage volume mounting request, granting mounting permission to the computing node upon determining the computing node erased remaining data to be written to a storage volume.

* * * * *